(12) United States Patent
Tsirkin et al.

(10) Patent No.: US 11,765,062 B2
(45) Date of Patent: Sep. 19, 2023

(54) AUTOMATIC RETRANSMISSION CAPABILITY IN HYPERVISOR

(71) Applicant: RED HAT, INC., Raleigh, NC (US)

(72) Inventors: Michael Tsirkin, Westford, MA (US); Francisco Javier Martinez Canillas, Barcelona (ES); Alberto Carlos Ruiz Ruiz, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/750,795

(22) Filed: Jan. 23, 2020

(65) Prior Publication Data

US 2021/0234787 A1  Jul. 29, 2021

(51) Int. Cl.
| | |
|---|---|
| *G06F 15/16* | (2006.01) |
| *H04L 43/16* | (2022.01) |
| *H04L 43/0817* | (2022.01) |
| *H04L 43/062* | (2022.01) |
| *H04L 41/0893* | (2022.01) |
| *H04L 43/0829* | (2022.01) |
| *G06F 9/455* | (2018.01) |

(52) U.S. Cl.
CPC .......... *H04L 43/16* (2013.01); *G06F 9/45558* (2013.01); *H04L 41/0893* (2013.01); *H04L 43/062* (2013.01); *H04L 43/0817* (2013.01); *H04L 43/0829* (2013.01); *G06F 2009/45595* (2013.01)

(58) Field of Classification Search
CPC . H04L 43/0829; H04L 43/0817; H04L 43/16; H04L 41/0893; H04L 43/062; G06F 2009/45595; G06F 9/45558; H04W 52/48; H04N 21/6375; H04N 21/64776

USPC .......................................................... 709/224
See application file for complete search history.

(56) References Cited

U.S. PATENT DOCUMENTS

| | | | |
|---|---|---|---|
| 7,574,709 B2 | 8/2009 | Erlingsson et al. | |
| 8,274,912 B2 | 9/2012 | Wray et al. | |
| 8,484,465 B1 * | 7/2013 | Reis ........................ | H04L 67/40 |
| | | | 713/167 |

(Continued)

OTHER PUBLICATIONS

Y. Deng, C. Hu, T. Wo, B. Li and L. Cui, "A Memory Deduplication Approach Based on Group in Virtualized Environments," 2013 IEEE Seventh International Symposium on Service-Oriented System Engineering, San Francisco, CA, USA, 2013, pp. 367-372 (Year: 2013).*

(Continued)

*Primary Examiner* — Oscar A Louie
*Assistant Examiner* — Messeret F Gebre
(74) *Attorney, Agent, or Firm* — Womble Bond Dickinson (US) LLP

(57) ABSTRACT

A packet is received by a hypervisor from a first virtualized execution environment, the packet to be provided to a second virtualized execution environment. It is then determined whether the packet was successfully delivered to the second virtualized execution environment. In response to determining that the packet was not successfully delivered to the second virtualized execution environment, a network policy is identified that indicates whether to subsequently provide the packet to the virtualized execution environment. In response to the network policy indicating that the packet is to be subsequently provided, the packet is provided to the virtualized execution environment again.

20 Claims, 5 Drawing Sheets

(56) References Cited

U.S. PATENT DOCUMENTS

| | | | | |
|---|---|---|---|---|
| 9,203,741 | B1* | 12/2015 | Martini | H04L 45/30 |
| 2005/0246453 | A1 | 11/2005 | Erlingsson et al. | |
| 2008/0080369 | A1* | 4/2008 | Sumioka | H04L 1/1887 |
| | | | | 370/229 |
| 2014/0359229 | A1* | 12/2014 | Cota-Robles | G06F 9/455 |
| | | | | 711/143 |
| 2015/0082087 | A1* | 3/2015 | Jacobs | G06F 11/1484 |
| | | | | 714/18 |
| 2015/0089500 | A1* | 3/2015 | Kompella | G06F 9/45558 |
| | | | | 718/1 |
| 2015/0095909 | A1* | 4/2015 | Li | G06F 9/45558 |
| | | | | 718/1 |
| 2016/0094462 | A1* | 3/2016 | Heitz | H04W 80/06 |
| | | | | 370/231 |
| 2016/0226628 | A1* | 8/2016 | Stephenne | H04L 1/18 |
| 2017/0170990 | A1* | 6/2017 | Gaddehosur | H04L 67/1031 |
| 2018/0295064 | A1* | 10/2018 | Movsisyan | H04L 45/70 |
| 2018/0359143 | A1 | 12/2018 | Chattopadhyay et al. | |
| 2019/0243673 | A1 | 8/2019 | Franciosi et al. | |
| 2019/0341999 | A1* | 11/2019 | Cooper | H04B 7/18515 |
| 2020/0326971 | A1* | 10/2020 | Yang | H04L 69/161 |
| 2021/0006642 | A1* | 1/2021 | He | H04L 43/18 |

OTHER PUBLICATIONS

Jingwei, Y., Kai, M., & Xiang, L. (2016). Virtualized GPU computing platform in clustered system environment. Journal of Beijing University of Aeronautics and Astronautics, 42(11), 2340-8 (Year: 2016).*

T. Wo, H. Wang, C. Hu and Y. Cui, "DVCE: The Virtual Computing Environment Supported by Distributed VM Images," 2012 IEEE 15th International Symposium on Object/Component/Service-Oriented Real-Time Distributed Computing Workshops, Shenzhen, China, 2012, pp. 81-86 (Year: 2012).*

"Command-Line Interface" Jul. 19, 2019, Citrix Systems, Inc., 106 pages.

Red Hat,Inc. (2019). "Managing Virtual Networks" 5 pages.

* cited by examiner

AUTOMATIC RETRANSMISSION CAPABILITY IN HYPERVISOR

TECHNICAL FIELD

Aspects of the present disclosure relate to network policies in a service mesh, and more particularly, to automatic retransmission capability in a hypervisor.

BACKGROUND

A hypervisor manages execution of virtualized resources. Communication between applications in virtualized execution environments, such as containers and virtual machines, is facilitated by physical and/or virtual network components.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
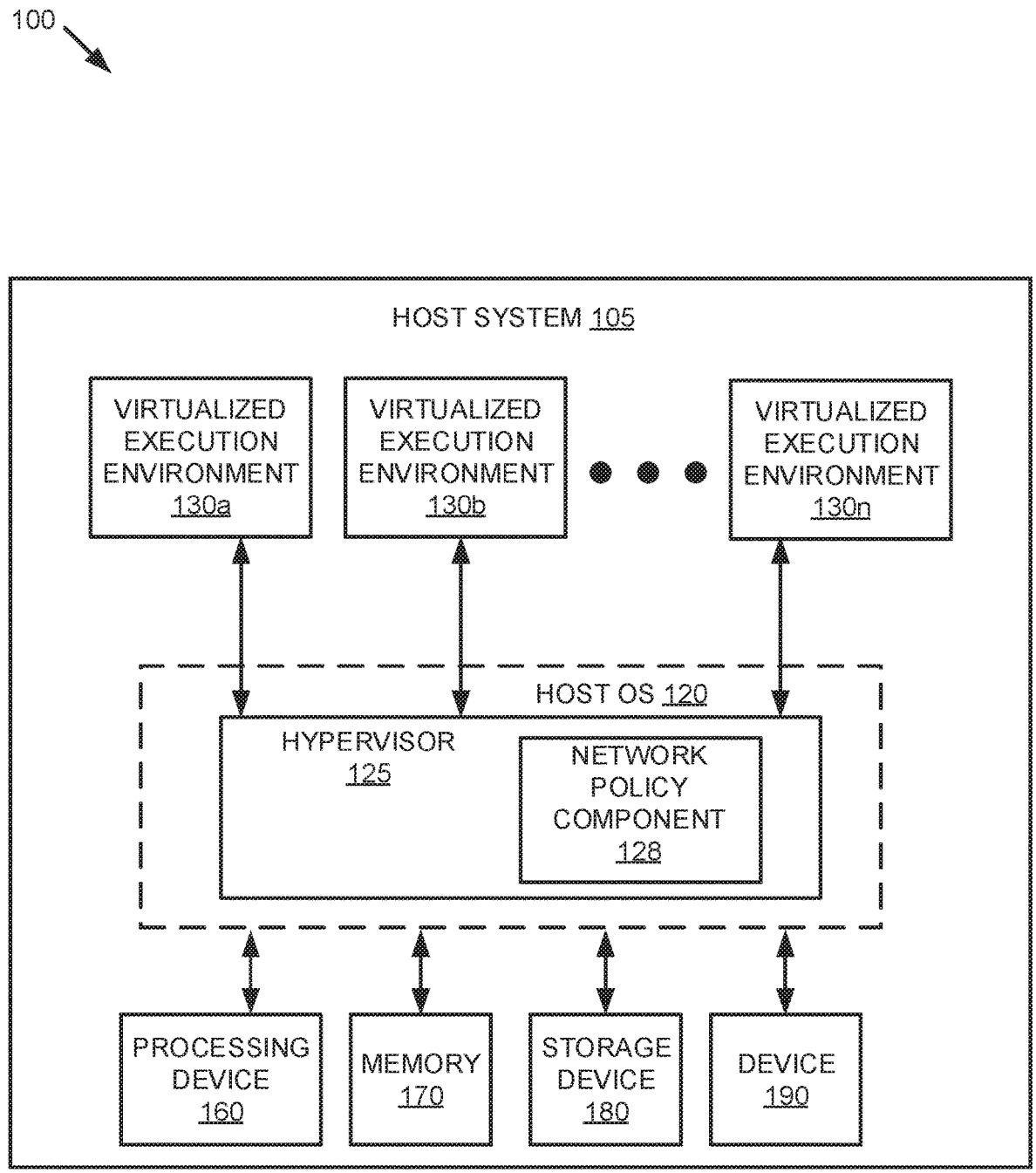
FIG. 1 is a block diagram that illustrates an example host system, in accordance with some embodiments.

With the advent of micro-service architectures, application developers need to be aware of possible transient errors when communicating with another software component. A transient error is an error that occurs temporarily and is likely to soon be fixed. This is also true in stand-alone/monolith applications but transient errors are more common in distributed applications due to components being implemented as individual services that communicate over a network (i.e., a large amount of network communication). Deployment rate has increased because development teams can individually update components of distributed applications. However, updating individual components can lead to services attempting to communicate with another service that is being redeployed, resulting in an intermittent transient error while the other service is taken down for the update.

In conventional architectures, either libraries are included to address the complexity associated with intermittent, transient errors or a network proxy that includes retry logic is used to hide the transient errors to the application completely. However, the library imposes restrictions on the programming languages that development teams can use since the applications have to be developed in one of the languages where the library has been ported. Restriction of languages that development teams can use undermines one major advantage of micro-service architectures to allow developers to choose the language and framework that best suit the developer's needs. Furthermore, the network proxies require constant management and have to be installed and updated. There is no standard way for services to discover and communicate with network proxies and proxies may not be replaced with another implementation without modifications to applications.

Aspects of the disclosure address the above-noted and other deficiencies by providing automatic retransmission capability in a hypervisor. The hypervisor, which manages virtual execution environments (i.e. virtual machines, containers, etc.), may include a hypervisor memory that stores one or more network polices that include retransmission logic for virtual machines and containers running different applications and services. Upon receipt of a communication packet (hereinafter referred to as "packet") from a first virtualized execution environment that is to be sent to a second virtualized execution environment, the hypervisor may identify a corresponding network policy. The hypervisor may forward the packet to the second virtualized execution environment. The hypervisor may then receive a notification from the second virtualized execution environment that the package was not successfully delivered. The hypervisor may retransmit the package to the second virtualized execution environment if the hypervisor has not already retransmitted the package a threshold number of times. The first and second virtualized execution environments may be virtual machines, containers, or other isolated execution environments.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes a host system 105. The host system 105 includes one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments of host system 105 may include a plurality of processing devices, storage devices, and devices. The host system 105 may be a server, a mainframe, a workstation, a personal computer (PC), a mobile phone, a palm-sized computing device, etc.

Host system 105 may additionally include one or more virtualized execution environments 130a-n and host operating system (OS) 120. Virtualized execution environments 130a-n may each be a virtual machine (VM), a container, or other execution environment. A VM may be a software implementation of a machine that executes programs as though it was an actual physical machine. A VM may include containers that each act as isolated execution environments for different services of applications, as previously described. Additionally, containers may be deployed without a VM. Host OS 120 manages the hardware resources of the computer system and provides functions such as interprocess communication, scheduling, memory management, and so forth.

Host OS 120 may include a hypervisor 125 (which may also be known as a virtual machine monitor (VMM)), which provides a virtual operating platform for virtualized execution environments 130a-n and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). Hypervisor 125 may include a network policy component 128. It should be noted that in some alternative implementations, hypervisor 125 may be external to host OS 120, rather than embedded within host OS 120, or may replace host OS 120.

Network policy component 128 can implement retransmission policies to facilitate the communication between containers 130a-n, as described in detail below with respect to FIGS. 2-4. Network policy component 128 may store and access network policies that include retransmission logic, retransmission counters, and other information, such as network addresses, for virtualized execution environments 130a-n that may be used by hypervisor 125 for sending and re-sending of packets between virtualized execution environments 130a-n. In embodiments, the network policies can be stored in an area of hypervisor memory accessible to network policy component 128, a shared memory space, a data structure saved in storage device 180, or the like.

Figure 2:
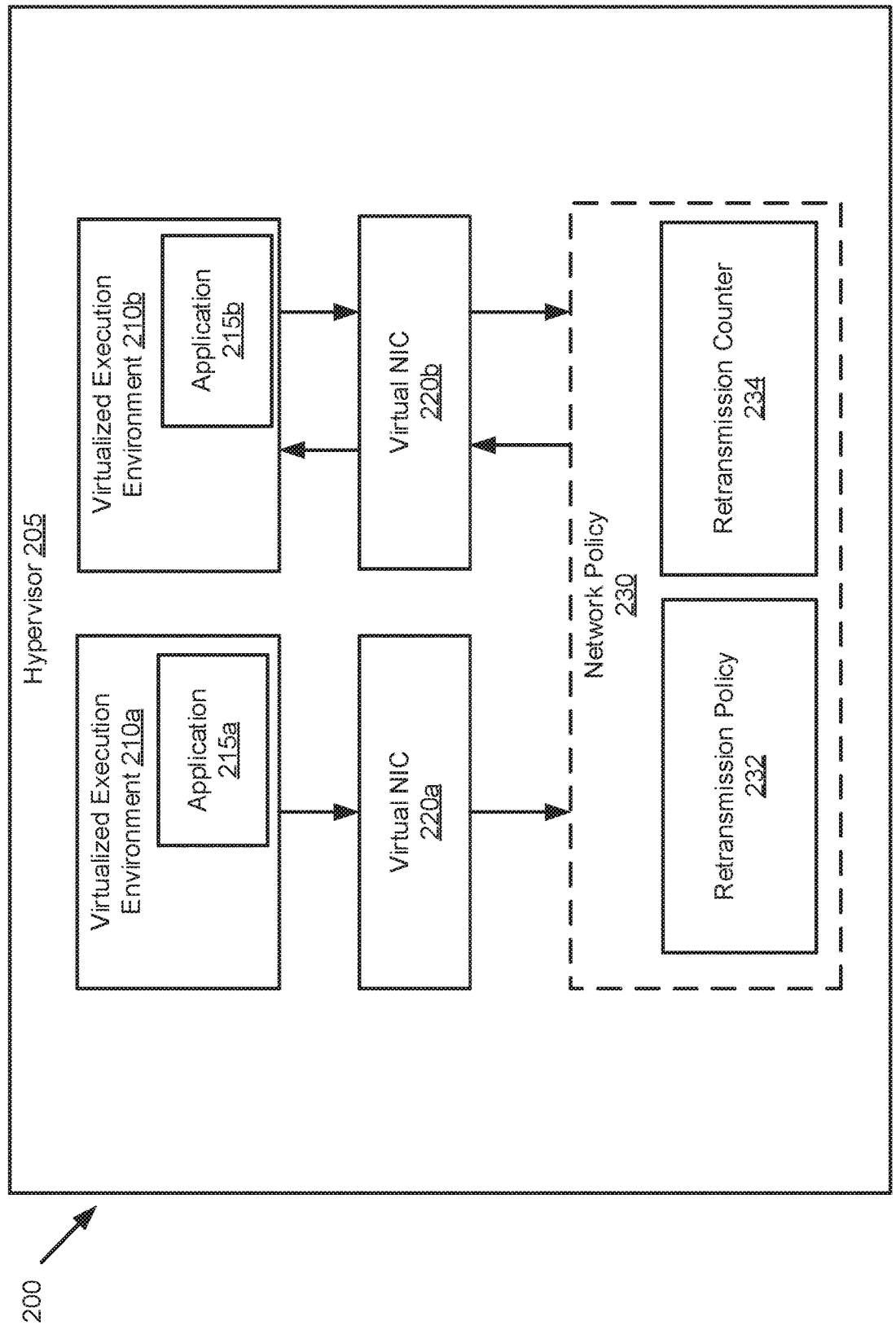
FIG. 2 is a block diagram that illustrates an example of implementing automatic retransmission capability by a hypervisor of a host system in accordance with embodiments of the disclosure.

FIG. 2 is a block diagram that illustrates an example of automatic retransmission capability in a hypervisor of a host system 200 in accordance with embodiments of the disclosure. The host system may include a hypervisor 205 and virtualized execution environments 210a, b, as previously described at FIG. 1. Virtualized execution environment 210a may be a VM or a container that acts as an execution environment for a first application 215a. Although referred to as an application, the application 215a may also be a service executing within a container. Virtualized execution environment 210b may be a VM or a container that acts as an execution environment for a second application 215b. Although referred to as an application, the application 215b may also be a service executing within a container. In some examples, the first application of virtualized execution environment 210a and the second application of virtualized execution environment 210b may use different programming languages. Virtualized execution environment 210a and virtualized execution environment 210b may be bridged to various network segments via virtual network interface controller (NIC) 220a and virtual NIC 220b, respectively. Virtual NICs 220a, b may each be abstract virtualized representations of a physical NIC of host system 200. Packets sent from and/or received by containers 210a, b may be transmitted via their respective virtual NICs (e.g., virtual NICs 220a, b).

The host system 200 may include a network policy 230 that is stored in the host system memory (e.g., memory 170 and/or storage device 180 of FIG. 1). In some examples, the network policy may be stored in an area of hypervisor memory accessible by hypervisor 205. The network policy 230 may include a retransmission policy 232, retransmission counters 234, and other information, such as network addresses, for virtualized execution environments 210a-b that may be used by hypervisor 205 for sending and resending of packets between virtualized execution environments 210a-b.

In one example, the retransmission policy 232 may include logic used by the hypervisor 205 to determine whether to retransmit a packet received from the first virtualized execution environment 210a to the second virtualized execution environment 210b. The hypervisor 205 may use the retransmission policy 232 to determine whether the packet was successfully transmitted to the second virtualized execution environment 210b. The hypervisor 205 may use the retransmission policy 232 to determine that the transmission was unsuccessful if an indication of successful transmission is not received from the second virtualized execution environment 210b within a threshold period of time. The retransmission policy 232 may indicate that the hypervisor 205 is to retransmit the packet once the hypervisor 205 determines that the transmission was unsuccessful. In addition, the retransmission policy 232 may retransmit the packet a defined period of time after determining that the transmission was unsuccessful (e.g., to allow additional time for the issue to be resolved). Each time the retransmission policy 232 retransmits the packet, it may increment the retransmission counter 234. The retransmission counter 234 may be used to track the number of times the packet has been retransmitted and may be compared to a threshold number to determine whether to retransmit the packet again. Once the threshold number is reached, the retransmission policy 232 may no longer retransmit the packet and send a notification to one or more components of the host system 200 (e.g., virtualized execution environment 210a, application 215a, the host operation system, etc.) indicating that the packet transmission failed.

Although illustrated as having a single network policy, embodiments of the disclosure may have any number of network policies that correspond to any number of virtualized execution environments executed by host system 200 or other host systems (not shown) operatively coupled to host system 200 via a network.

In some examples, the hypervisor 205 may receive the network policy 230 from a container orchestration system that provides service mesh logic that includes one or more network policies that may be used by hypervisor 205 for implementing a service mesh. In some examples, the network policy 230 may be received from virtualized execution environment 210a (i.e., a container or VM). In some examples, the network policy 230 may be received from the application 215a. In one example, the network policy 230 may be received from other sources.

In some examples, the network policy 230 may include a forwarding rule that forwards all or a portion of packets from a particular container to one or more destination containers. For example, the network policy 230 may include a forwarding rule that forwards all packets from container 210a to container 210b. In another example, the network policy 230 may include a forwarding rule that forwards 90% of packets from container 210a to container 210b.

In some examples, the network policy 230 is a dynamic policy which can be updated when certain conditions occur. For example, if the hypervisor 205 identifies that the rate of transmission from virtualized execution environment 210a results in a large number (e.g., a threshold number) of retries, or errors, then the hypervisor 205 may indicate to the application 215a that the rate of transmission is too large. The application 215a may then send a notification to the hypervisor 205 to update the network policy 230. In one example, the hypervisor 205 may adjust the threshold number of retries prior to indicating the error to the guest OS. In another example, the hypervisor 205 may adjust the delay between retries to optimize the allowed time for the error to be resolved. For example, a particular type of error may occur frequently that is resolved after some period of time. The hypervisor 205 can then adjust the delay to more closely mirror the time taken to resolve the error. In another embodiment, the hypervisor 205 may track different parameters (e.g., rate of retry, number of transient errors, length of transient errors, length of time between error and successful retry, etc.) associated with the retries to identify patterns associated with transmission between particular virtual execution environments.

Figure 3:
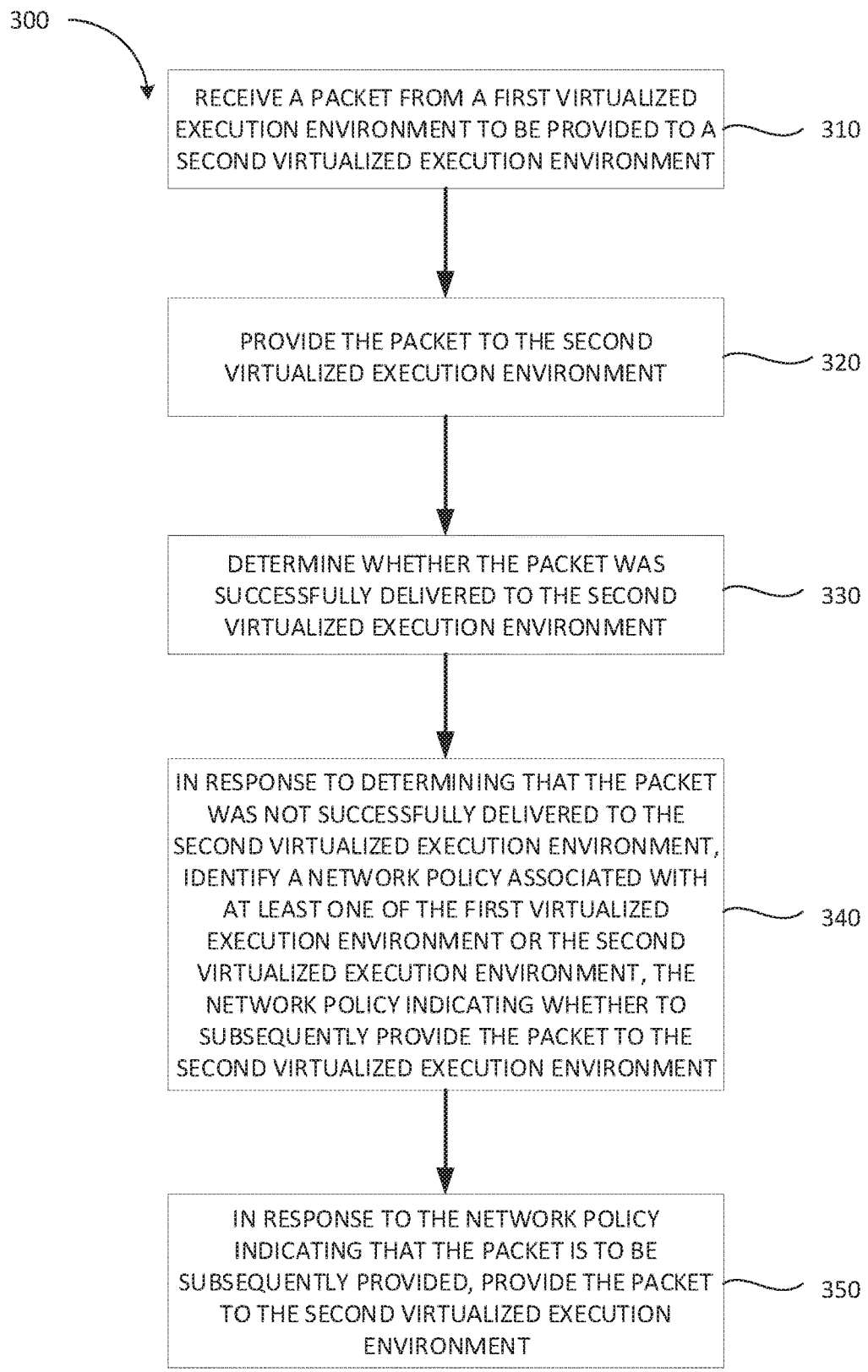
FIG. 3 is a flow diagram of a method of automatic retransmission of data at the hypervisor layer, in accordance with some embodiments.

FIG. 3 is a flow diagram of a method 300 of automatic retransmission capability in a hypervisor, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by a network policy component 128 of hypervisor 125 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives a packet from a first virtualized execution environment to be provided to a second virtualized execution environment. In some examples, the packet may be received by a hypervisor. At block 320, the processing logic provides the packet to the second virtualized execution environment. In some examples, the processing logic may perform a network address translation on the packet to forward to the second virtualized execution environment.

At block 330, the processing logic determines whether the packet was successfully delivered to the second virtualized execution environment. In some examples, the processing logic may determine whether an acknowledgment that the packet was successfully delivered has been received from the second container. If the acknowledgement has been received, the processing logic determines that the packet was successfully delivered to the second container. If the acknowledgment has not been received, the processing logic determines that the packet was not successfully delivered to the second container. In some examples, the processing logic may determine whether the packet was successfully delivered in view of the acknowledgment being received within a threshold amount of time. For example, the processing logic may determine whether the packet was successfully delivered if the acknowledgment is received within 2 seconds from the time the packet was sent.

At block 340, in response to determining that the packet was not successfully delivered to the second virtualized execution environment, the processing logic identifies a network policy associated with at least one of the first virtualized execution environment or the second virtualized execution environment. The network policy may indicate whether to subsequently provide the packet to the second virtualized execution environment. For example, the network policy may indicate whether the processing logic should retry sending the packet to the second container if the packet was not successfully delivered on the first attempt.

At block 350, in response to the network policy indication that the packet is to be subsequently provided, the processing logic provides the packet to the second virtualized execution environment. In some examples, the network policy may indicate a maximum number of retry attempts for providing the packet. For example, the network policy may indicate that the processing logic attempt to subsequently provide the packet to the second container 5 times before no more attempts are made. If the subsequently provided packet is successfully delivered to the second container, then the processing logic may determine to no longer subsequently provide packets to the second container. If the subsequently provided packet is not successfully delivered, the processing logic may generate an error notification and provide the error notification to the first container indicating that the packet was not successfully delivered to the second container.

Figure 4:
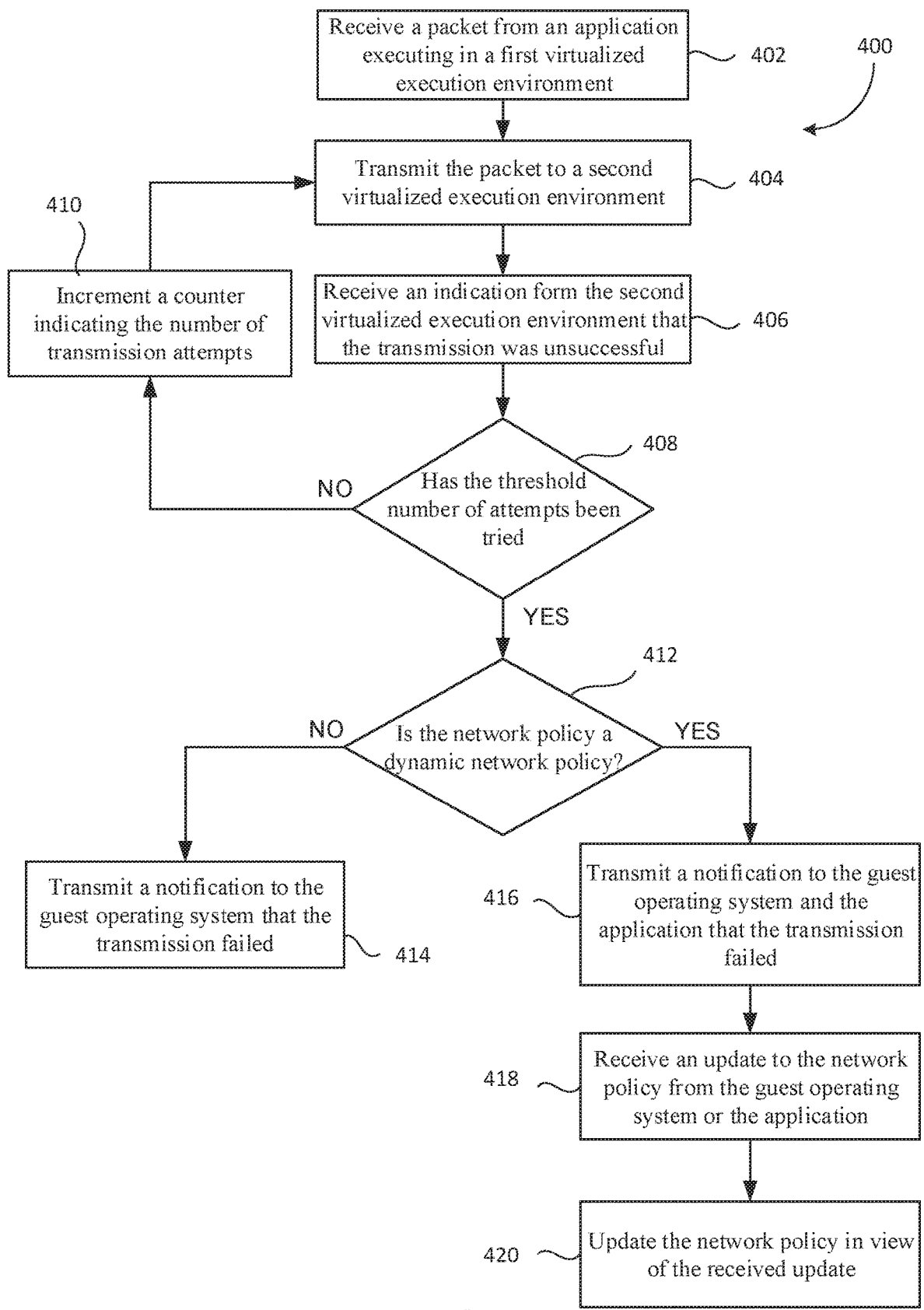
FIG. 4 is a flow diagram of a method of using a dynamic network policy for automatic transmission of data at the hypervisor layer, in accordance with some embodiments.

FIG. 4 is a flow diagram of a method 400 of a dynamic network policy for retransmission capabilities in a hypervisor, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a network policy component 128 of hypervisor 125 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 402, where the processing logic receives a packet from an application executing in a first virtualized execution environment. The first virtualized execution environment may be a container, a virtual machine (VM), or any other virtualized environment in which applications, services, or micro-services may be executed. The packet may be a packet of data that is transmitted from an application, service, or micro-service of the first virtualized execution environment to be communicated to another application, service, or micro-service. At block 404, the processing logic transmits the packet to the second virtualized execution environment. The second virtualized execution environment may be a container, a VM or other virtualized environments.

At block 406, the processing logic receives an indication from the second virtualized execution environment that the transmission was unsuccessful. In one example, the indication that the transmission was unsuccessful is that an amount of time has elapsed prior to receiving an acknowledgement that the packet was received by the second virtualized execution environment. In another example, the second virtualized execution environment may expect to receive the packet. When the packet is not received within a certain period of time, the second virtualized execution environment may provide a notification to the hypervisor that the packet was not received.

At block 408, the processing logic determines if a threshold number of attempts to transmit the packet has been tried. The processing logic may keep track of the number of attempts to transmit the packet using a counter. The processing logic may increment the counter each time a new attempt is made. In embodiments, a threshold number of attempts may be defined by a network policy. Each time an attempt fails, the counter may be compared to the threshold number of attempts to determine if the threshold number of attempts has been reached. The threshold number may indicate the maximum number of times the processing logic should attempt to transmit the packet before ceasing any more attempts.

At block 410, in response to determining that the threshold number of attempts has not been reached, the processing logic increments a transmission counter and then returns to block 404 to attempt to transmit the packet another time. The transmission counter may indicate the number of times the transmission to the second virtualized execution environment has been attempted. The processing logic may also wait a threshold amount of time prior to retransmitting the packet. The threshold amount of time may be measured from the time of last transmitting the packet or from the time of receiving the indication that the packet was not successfully delivered.

At block 412, in response to determining that the threshold number of attempts has been reached, the processing logic determines whether the policy is a dynamic policy. A dynamic policy may be updated during runtime based on usage, transmission efficiency, amount of traffic, number of retries, etc. Different facets of the network policy may be updated to provide for more efficient packet transfer. The processing logic may adjust the rate of packet transfer from the first virtualized execution environment. The processing logic may adjust the delay between retries to optimize the allowed time for the error to be resolved. For example, a particular type of error may occur frequently that is resolved after some period of time. The processing logic can then adjust the delay to more closely mirror the time taken to resolve the error. In another embodiment, the processing logic may track different parameters (e.g., rate of retry, number of transient errors, length of transient errors, length of time between error and successful retry, etc.) associated with the retries to identify patterns associated with transmission between particular virtual execution environments.

At block 414, in response to determining that the network policy is not a dynamic policy, the processing logic transmits a notification to a guest OS that the transmission failed. If the policy is not dynamic, there may be no further updates during runtime from the guest or the application etc. However, an administrator may still manually update the network policy as needed.

At block 416, the processing logic transmits a notification to the guest OS and/or the application that the transmission failed. In embodiments, the retransmission attempts up to this point may be transparent to the guest OS and the application. At block 418, the processing logic receives an update to the network policy from the guest operating system or the application. For example, the update may include any of the updates described above at block 412. At block 420, the processing logic updates the network policy to reflect the received update from the guest operating system or the application.

Figure 5:
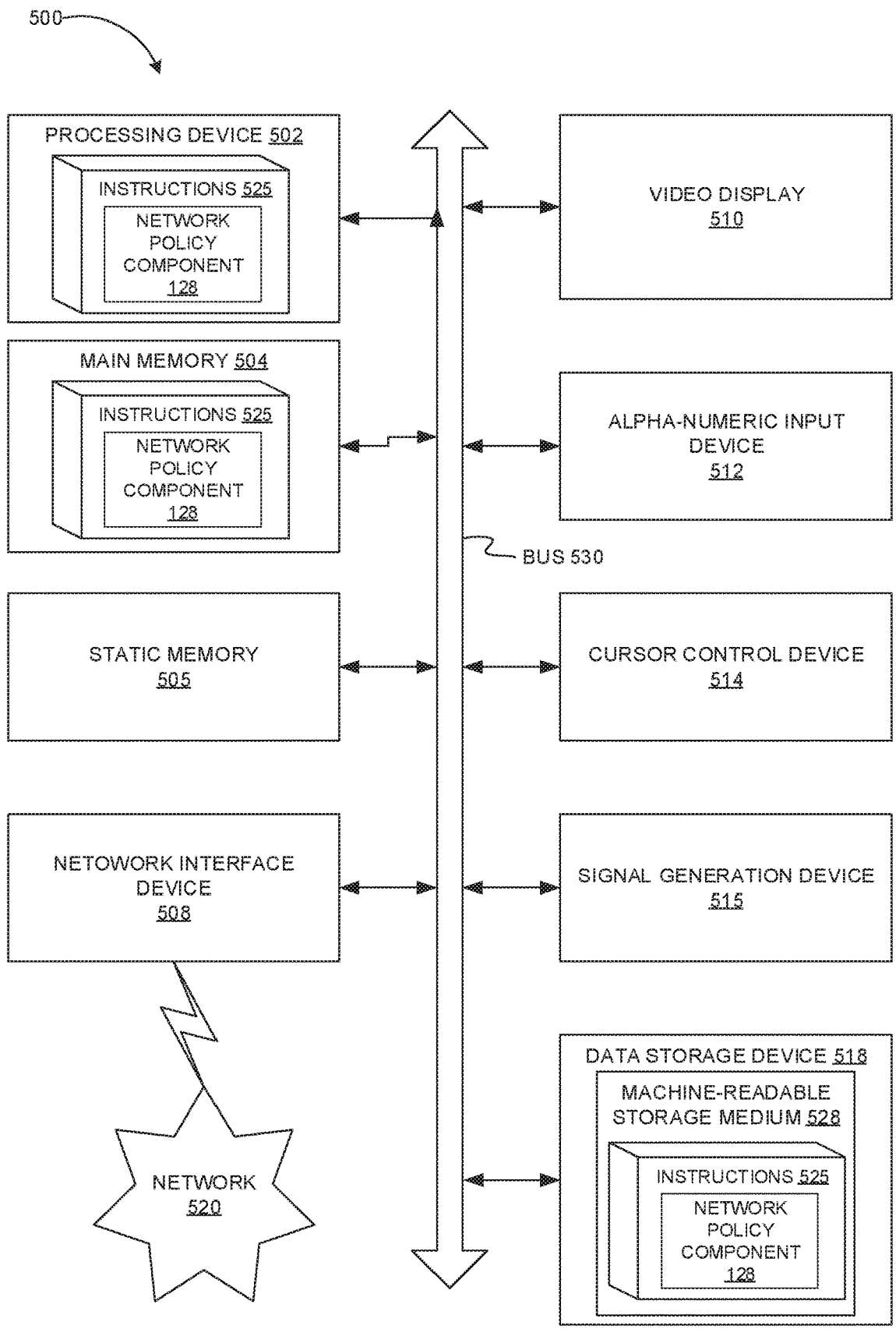
FIG. 5 is a block diagram of an example apparatus that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for a network policy component, e.g., network policy component 128 for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving, by a processing device executing a hypervisor, a packet from a first virtualized execution environment;
providing, by the hypervisor, the packet to a second virtualized execution environment, wherein the first virtualized execution environment and the second virtualized execution environment are included in a service mesh managed by the hypervisor;
determining, by the hypervisor, whether the packet was successfully delivered to the second virtualized execution environment;
in response to determining that the packet was not successfully delivered to the second virtualized execution environment:
identifying, by the hypervisor, a network policy at the hypervisor, the network policy indicating whether to subsequently provide the packet to the second virtualized execution environment; and
in response to the network policy indicating that the packet is not to be subsequently provided, adjusting by the hypervisor one or more parameters of the network policy at the hypervisor, the one or more parameters comprising different types of parameters including two or more of a time delay between retransmission attempts of the packet, a rate of retry, and a number of transient errors, wherein the one or more parameters are tracked to identify patterns associated with transmission between the first and the second virtualized execution environments, the patterns comprising at least a time for repeated errors to be resolved; and
in response to the network policy indicating that the packet is to be subsequently provided, providing, by the hypervisor, the packet to the second virtualized execution environment.

2. The method of claim 1, wherein determining that the packet was not successfully delivered comprises:
receiving, from the second virtualized execution environment, an indication that delivery of the packet to the second virtualized execution environment was unsuccessful.

3. The method of claim 1, wherein the network policy indicates a threshold number of times the packet is to be subsequently provided to the second virtualized execution environment.

4. The method of claim 3, further comprising:
determining whether a number of times the packet has been subsequently provided to the second virtualized execution environment satisfies the threshold number of times indicated by the network policy; and
in response to determining that the number of times the packet has been subsequently provided to the second virtualized execution environment satisfies the threshold number of times indicated by the network policy, determining to not subsequently provide the packet to the second virtualized execution environment.

5. The method of claim 3, further comprising:
receiving, from an application executing in the first virtualized execution environment, an update to the network policy, wherein the update comprises a new threshold number of times to subsequently provide the packet to the second virtualized execution environment.

6. The method of claim 1, wherein the packet is received from a first application executing in the first virtualized execution environment and provided to a second application executing in the second virtualized execution environment, wherein the first application uses a first programming language and the second application uses a second programming language that is different than the first programming language.

7. The method of claim 1, wherein the first virtualized execution environment and the second virtualized execution environment are containers residing within one or more virtual machines.

8. A system comprising:
a memory; and
a processing device executing a hypervisor, operatively coupled to the memory, the processing device to:
receive, by the hypervisor, a packet from a first virtualized execution environment;
identify, by the hypervisor, a network policy at the hypervisor for applying to the packet;
provide, by the hypervisor, the packet to a second virtualized execution environment, wherein the first virtualized execution environment and the second virtualized execution environment are included in a service mesh managed by the hypervisor;
determining whether the packet was successfully delivered to the second virtualized execution environment;
in response to determining that the packet was not successfully delivered to the second virtualized execution environment:
determine, by the hypervisor, whether the network policy indicates that the packet is to be subsequently provided to the second virtualized execution environment; and
in response to the network policy indicating that the packet is not to be subsequently provided, adjust, by the hypervisor, one or more parameters of the network policy at the hypervisor, the one or more parameters comprising different types of parameters including two or more of a time delay between retransmission attempts of the packet, a rate of retry, and a number of transient errors, wherein the one or more parameters are tracked to identify patterns associated with transmission between the first and the second virtualized execution environments, the patterns comprising at least a time for repeated errors to be resolved; and
in response to determining that the network policy indicates that the packet is to be subsequently provided, provide, by the hypervisor, the packet to the second virtualized execution environment.

9. The system of claim 8, wherein the network policy indicates a threshold number of attempts for the hypervisor to subsequently provide the packet to the second virtualized execution environment.

10. The system of claim 9, wherein the processing device is further to:
determine whether a number of times the hypervisor has subsequently provided the packet to the second virtualized execution environment satisfies the threshold number of attempts indicated by the network policy; and
in response to determining that the number of times the hypervisor has subsequently provided the packet satisfies the threshold number of attempts, determine to not subsequently provide the packet to the second virtualized execution environment.

11. The system of claim 8, wherein the processing device is further to:

receive, from an application executing in the first virtualized execution environment, an update to the network policy, wherein the update comprises a new threshold number of attempts to subsequently provide the packet to the second virtualized execution environment; and updating the network policy according to the new threshold number of attempts.

12. The system of claim 8, wherein to identify the network policy for the packet, the processing device is to:
identify a plurality of network policies, each of the plurality of network policies having a corresponding network address; and
identifying the network policy from the plurality of network policies in view of a network address associated with the packet matching the corresponding network address of the network policy.

13. The system of claim 8, wherein the first virtualized execution environment and the second virtualized execution environment are virtual machines communicatively coupled via a virtual network.

14. The system of claim 8, wherein the first virtualized execution environment and the second virtualized execution environment are containers residing within one or more virtual machines.

15. A non-transitory computer-readable storage medium including instructions that, when executed by a processing device, cause the processing device to:
receive, by the processing device executing a hypervisor, a packet from a first virtualized execution environment;
provide, by the hypervisor, the packet to a second virtualized execution environment, wherein the first virtualized execution environment and the second virtualized execution environment are included in a service mesh managed by the hypervisor;
determine, by the hypervisor, whether the packet was successfully delivered to the second virtualized execution environment;
in response to determining that the packet was not successfully delivered to the second virtualized execution environment:
identify, by the hypervisor, a network policy at the hypervisor, the network policy indicating whether to subsequently provide the packet to the second virtualized execution environment; and
in response to the network policy indicating that the packet is not to be subsequently provided, adjust by the hypervisor one or more parameters of the network policy, the one or more parameters comprising different types of parameters including two or more of a time delay between retransmission attempts of the packet, a rate of retry, and a number of transient errors, wherein the one or more parameters are tracked to identify patterns associated with transmission between the first and the second virtualized execution environments, the patterns comprising at least a time for repeated errors to be resolved; and
in response to the network policy indicating that the packet is to be subsequently provided, provide, by the hypervisor, the packet to the second virtualized execution environment.

16. The non-transitory computer-readable storage medium of claim 15, wherein to determine that the packet was not successfully delivered the processing device is further to:
receive, from the second virtualized execution environment, an indication that delivery of the packet to the second virtualized execution environment was unsuccessful.

17. The non-transitory computer-readable storage medium of claim 15, wherein the network policy indicates a threshold number of times the packet is to be subsequently provided to the second virtualized execution environment.

18. The non-transitory computer-readable storage medium of claim 17, wherein the processing device is further to:
determine whether a number of times the packet has been subsequently provided to the second virtualized execution environment satisfies the threshold number of times indicated by the network policy; and
in response to determining that the number of times the packet has been subsequently provided to the second virtualized execution environment satisfies the threshold number of times indicated by the network policy, determine to not subsequently provide the packet to the second virtualized execution environment.

19. The non-transitory computer-readable storage medium of claim 17, wherein the processing device is further to:
receive, from an application executing in the first virtualized execution environment, an update to the network policy, wherein the update comprises a new threshold number of times to subsequently provide the packet to the second virtualized execution environment.

20. The non-transitory computer-readable storage medium of claim 15, wherein the packet is received from a first application executing in the first virtualized execution environment and provided to a second application executing in the second virtualized execution environment, wherein the first application uses a first programming language and the second application uses a second programming language that is different than the first programming language.

* * * * *